May 8, 1962
R. C. DINSMORE
3,033,044
SPEEDOMETER
Filed Nov. 18, 1959
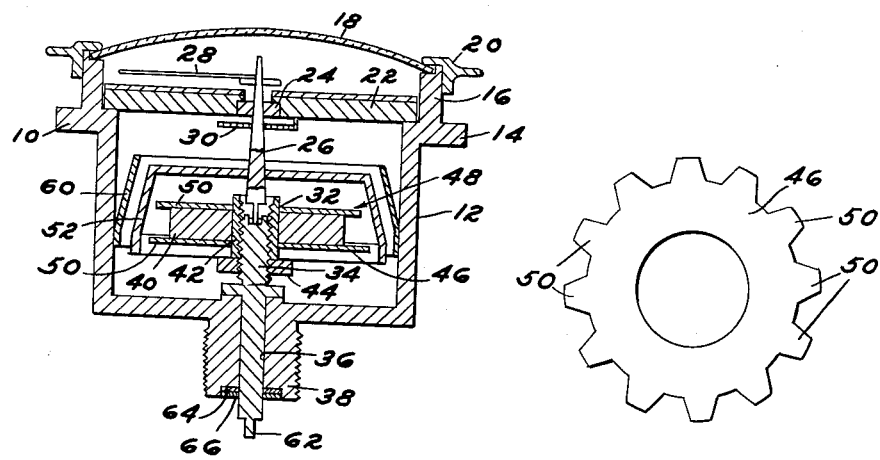
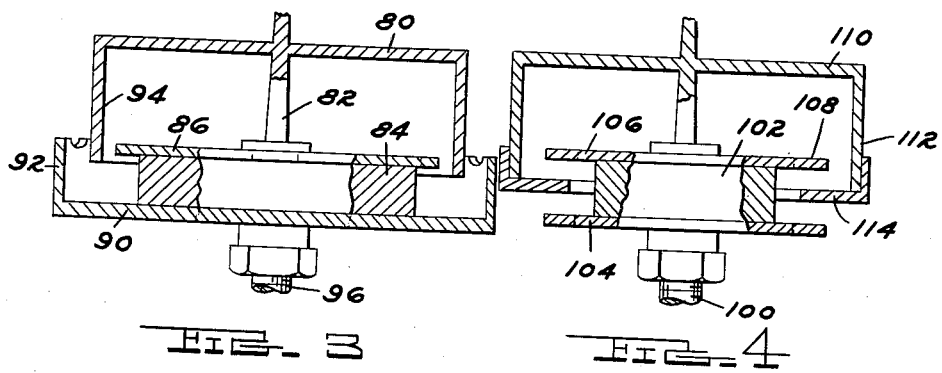
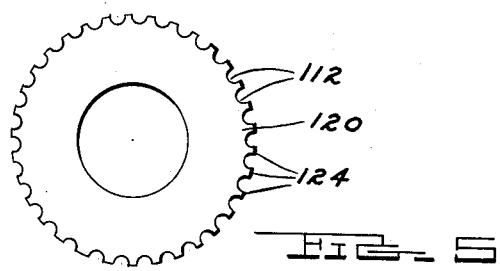
INVENTOR.
ROBERT C. DINSMORE
BY
Barnes, Kisselle,
Raisch & Choate
ATTORNEYS

United States Patent Office 3,033,044
Patented May 8, 1962

3,033,044
SPEEDOMETER
Robert C. Dinsmore, Flint, Mich., assignor to Dinsmore Instrument Company, Flint, Mich., a corporation of Michigan
Filed Nov. 18, 1959, Ser. No. 853,786
3 Claims. (Cl. 73—520)

This invention relates to a speedometer mechanism and has particularly to do with that portion of a speedometer which is usually called the "induction system."

In the use of speedometers for vehicles, the speed of the vehicle is usually taken off from the drive shaft or wheel of the vehicle. This speed must be transferred from a continuous rotary motion to a steady indicator position at the registering portion of the speedometer.

It has been common to accomplish this by utilizing a magnet inside an aluminum or copper cup. The magnet is the driven member responsive directly to the speed of the vehicle. The aluminum or copper cup is rotated by the eddy currents of the moving magnet, and the pointer or registering device is fastened to the aluminum or copper cup. There is thus a dragging action on the cup resulting from the movement of the magnet which operates against a resilient resistance.

This described device has the disadvantage that the magnets used in the construction may vary in strength, and it is difficult to calibrate the device properly. Also, as speedometers have become larger and more complicated, the ordinary drag of a single magnet has been insufficient and tandem drives have been found necessary, making calibration doubly difficult. In addition, these devices have been costly.

It is the object then to provide an improved device which is relatively inexpensive, which is easily calibrated and which creates an accurate reflection of the speed of the rotating member.

It is an object of the present invention to accomplish these improved results utilizing new materials and new constructions.

Other objects and features of the invention relating to details of construction and operation will be apparent in the following description and claims.

Drawings accompany the disclosure and the various views thereof may be briefly described as:

FIGURE 1, a sectional view of the asembled speedometer.

FIGURE 2, a plan view of the pole piece utilized.

FIGURE 3, a modified construction utilizing the basic invention.

FIGURE 4, a modified construction utilizing the basic invention.

FIGURE 5, a plan view of a modified pole disc.

It has become desirable, in view of the speedometer art, to develop magnets with a high coercive value. The so-called Alnico or permanent magnet material formed of alloy metal has a most efficient operation when it has a length to diameter ratio of approximately six to one; the new barium ferrite magnets have their maximum efficiency at a ratio closely approximately one to one. As a magnet is increased in coercive value, its resistance to partial demagnetization also increases. Consequently, it has proved to be quite difficult to calibrate high coercive strength magnets since calibration has been accomplished by initial magnetization and then partial demagnetizing.

If a disc or ring of barium ferrite material or other high coercive magnet material is used as the driving magnet for a speedometer construction, the drag strength on a speed cup is increased as the number of poles are increased. According to the present invention, the number of poles introduced into the magnet itself is only two, one face of the magnet being north pole and the other face being a south pole. The molded magnets are formed from powdered material which is hardened by a sintering action. Two ingredients of such a material are barium carbonate and iron oxide molded in powdered form and sintered to proper hardness. Metals having the trademarks "Indox" and "Indalloy," manufactured by the Indiana Steel Products of Valparaiso, Indiana, are available for magnets in this application.

A plurality of poles is then obtained from the two pole magnet by applying pole pieces or armatures against these poles. Calibration then becomes a matter of changing magnetism at the pole pieces. One way to alter the drag on the speed cup is to use a tapered cup and alter the relationship between the magnet and the cup to bring it closer or farther away from the surface of the cup.

A second method of calibration is simple mechanical deformation of the pole pieces pushing one or two pole pieces closer to the other pole piece, making a smaller air gap, thus shunting out more of the magnetic lines of force.

Now referring to the drawings, in FIGURE 1 a speedometer construction is shown wherein a frame member 10 has a cylindrical portion 12, a flange 14 and an upper dial enclosure 16. The dial enclosure is covered by a transparent plate 18 held in place by a bezel 20. A frame yoke bar 22 serves as a support for an upper bearing member 24 for receiving the needle shaft 26 on which is mounted the pointer needle 28. A return hair spring 30 is anchored in the yoke member 22 and acts on the needle 26.

The needle 26 is mounted in a lower cup bearing assembly 32 mounted in a threaded stud 34 which in turn is rotatably mounted in a hole 36 drilled in a cylindrical extension 38 of the housing 12.

A disc magnet 40 preferably of barium ferrite is mounted on a threaded collar 42 on the top of the threaded stud 34. The collar is axially adjustable on the stud and can be locked in place by a lock nut 44. On either face of the barium ferrite magnet 40 are pole pieces 46 and 48 each of which comprises an apertured disc of soft iron or some other magnetic material around the collar 42, each disc having a plurality of deformable pole pieces 50. The disc 48 is slightly smaller than the disc 46. Mounted on the needle 26 is a truncated conical cup-like shell 52 enclosing the magnet and pole piece assembly. The shell 52 is preferably formed of aluminum or copper and can be brazed to the shaft 26. Around the shell 52 and mounted on the walls of the frame member 12 is a soft iron shunt ring 60 having a tapered wall parallel to that of the shell 52.

In the operation of the device shown in FIGURE 1, the drive shaft stud 34 is fastened at a keyed end 62 to a suitable flexible cable. The shaft is held in place by a washer 64 and a snap ring 66. Lines of magnetic force normally will pass between the pole projections 50 but some of the lines of force will be shunted around through the shunt ring 60. These lines of force cut through the shell 52, and the rotation of the shell is effected by the lines of force which pass through the shell as the magnetic member 40 and the pole pieces 46 and 48 rotate. The effectiveness of the lines of force on the shell can be decreased by deforming the tabs 50 on the opposed plates 46 and 48 toward each other to cause more of the lines of force to shunt directly between the tabs eliminating passage into the shunt ring.

Thus it is possible for an operator to calibrate the described speedometer in two ways. He can do it by raising or lowering the collar 42 on the stud 34, thus bringing the pole pieces closer or farther away from the tapered shunt ring and varying the amount of magnetic flux which passes through the shell 52 to the shunt ring 60. He can also deform the projections 50 toward or away from each other to supplement this adjustment or to accomplish this same purpose.

In FIGURE 3 a modification of the speedometer driving mechanism is shown with a cup-like shell 80 being mounted on the pin 82, the disc magnet 84 having on one side a pole plate 86 which is composed of a circular plate, and a pole plate 90 which is a cup-shaped piece having a diameter larger than the cup 80, the wall 92 overlapping the wall 94 to a degree; the wall 92 preferably has an undulating edge to create separate poles. The drive shaft 96 moves the magnet and pole pieces while the shell 80 is mounted centrally of the plate 86 as shown in FIGURE 1.

In FIGURE 4, a second construction is shown wherein a drive shaft 100 drives a disc magnet 102 with pole pieces 104 and 106 mounted on either side. The pole pieces again can be formed with multiple projections 108 which form various opposed poles, and the driving shell 110 has a cylindrical side wall 112 with an inwardly turned flange 114 which projects in between the pole pieces 104 and 106. To facilitate assembly the pole piece 106 can be formed segmentally.

As previously stated, it is preferable that the pole pieces have as many poles as possible and one way to accomplish this is illustrated in FIGURE 5, wherein a pole piece 120 is provided around its periphery with a plurality of semi-circular recesses 112 which form between them pole pieces 124. The pole pieces 86 of FIGURE 3 and 104 and 106 of FIGURE 4 are preferably formed in this fashion.

I claim:

1. A magnetic coupling device for translating rotating motion into a steady indicator position for speedometers and the like which comprises means mounted for rotary motion in response to a movement to be measured, a round disc-like magnet of permanent magnetic material on said means, pole pieces on said magnet to create a plurality of opposed poles comprising a sheet of magnetic material on each side of said disc-like magnet having peripheral portions extending radially outwardly beyond said disc and having opposed radial projections to serve as opposed poles, and a biased response indicator means rotatably and concentrically mounted adjacent said magnet having an axially extending circumferential portion disposed adjacent said pole sheets radially spaced therefrom in the field of flux of said pole sheets, the radial projections on said sheets being formed of deformable material to permit intentional manual deformation of said projections to a fixed position toward or away from each other to alter the magnetic flux field effect of said permanent magnet.

2. A speedometer construction as defined in claim 1 in which said flat pole sheets are of differing diameters, one being smaller than the other, and said indicator means is formed as a tapered cup having the smaller of said sheets further within said cup than the larger of said sheets, said magnet and sheet assembly being adjustable axially relative to said cup to vary the air gap between the projections on said sheet and the wall of said cup.

3. A speedometer as defined in claim 2 in which a stationary shunt ring is mounted adjacent said response means spaced radially therefrom but having conical walls angled similar to that of the response means.

References Cited in the file of this patent

UNITED STATES PATENTS

| 1,033,840 | Stewart | July 30, 1912 |
| 1,312,083 | Smith | Aug. 5, 1919 |
| 2,871,383 | King | Jan. 27, 1959 |

FOREIGN PATENTS

| 195,942 | Germany | Feb. 29, 1908 |
| 745,146 | Germany | Feb. 28, 1944 |
| 755,491 | Germany | Oct. 19, 1953 |
| 494,051 | Great Britain | Oct. 19, 1938 |
| 713,463 | Great Britain | Aug. 11, 1954 |